United States Patent
Wada et al.

(10) Patent No.: US 10,007,570 B2
(45) Date of Patent: Jun. 26, 2018

(54) MONITORING UNIT, CONTROL SYSTEM, AND COMPUTER READABLE MEDIUM

(71) Applicant: MITSUBISHI ELECTRIC CORPORATION, Tokyo (JP)

(72) Inventors: Yuta Wada, Tokyo (JP); Yuichi Tokunaga, Tokyo (JP); Hirohito Nishiyama, Tokyo (JP); Masuo Ito, Tokyo (JP); Tatsunori Tsujimura, Tokyo (JP); Shigekazu Okamura, Tokyo (JP); Daisuke Tanimoto, Tokyo (JP); Makoto Itoi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days. days.

(21) Appl. No.: 14/917,526

(22) PCT Filed: Dec. 4, 2013

(86) PCT No.: PCT/JP2013/082554
§ 371 (c)(1),
(2) Date: Mar. 8, 2016

(87) PCT Pub. No.: WO2015/083251
PCT Pub. Date: Jun. 11, 2015

(65) Prior Publication Data
US 2016/0217023 A1 Jul. 28, 2016

(51) Int. Cl.
*G06F 11/00* (2006.01)
*G06F 11/07* (2006.01)

(52) U.S. Cl.
CPC ........ *G06F 11/079* (2013.01); *G06F 11/0739* (2013.01); *G06F 11/0751* (2013.01); *G06F 11/0796* (2013.01)

(58) Field of Classification Search
CPC ............... G06F 11/079; G06F 11/0739; G06F 11/0751; G06F 11/0796
See application file for complete search history.

(56) References Cited

U.S. PATENT DOCUMENTS

| 8,155,824 B2 | 4/2012 | Sakai et al. |
| 8,495,433 B2 | 7/2013 | Murao |
| 2009/0198407 A1 | 8/2009 | Sakai et al. |

(Continued)

FOREIGN PATENT DOCUMENTS

| JP | 2000-166017 A | 6/2000 |
| JP | 2007-3219 A | 1/2007 |
| JP | 2007-67812 A | 3/2007 |

(Continued)

*Primary Examiner* — Bryce Bonzo
*Assistant Examiner* — Katherine Lin
(74) *Attorney, Agent, or Firm* — Birch, Stewart, Kolasch & Birch, LLP

(57) ABSTRACT

In an in-vehicle network system (100), a parent control unit (10) and a child control unit (20) constitute a control unit. In the in-vehicle network system (100), a monitoring unit (70) acquires communication data being communicated between the parent control unit (10) and the child control unit (20) and flowing in an in-vehicle network (30) which connects the parent control unit (10) and the child control unit (20) to each other. The monitoring unit (70) diagnoses an abnormality in the parent control unit (10) based on the communication data acquired by the monitoring unit (70) and diagnostic data stored by a memory unit.

6 Claims, 13 Drawing Sheets

| RULE NUMBER | STATE | INPUT INFORMATION | OUTPUT INFORMATION |
|---|---|---|---|
| 1 | S | A | 0 |
| 2 | S | B | P |
| 3 | T | A | P |
| 4 | T | B | 0 |

(56) References Cited

U.S. PATENT DOCUMENTS

2011/0246820 A1  10/2011  Murao
2012/0065823 A1   3/2012  Taguchi et al.

FOREIGN PATENT DOCUMENTS

| JP | 2009-184423 A | 8/2009 |
|----|---------------|--------|
| JP | 2010-244311 A | 10/2010 |
| JP | 2012-6535 A | 1/2012 |
| JP | 2012-60842 A | 3/2012 |
| JP | 2012-245938 A | 12/2012 |
| JP | 2013-25570 A | 2/2013 |
| WO | WO 2011/114493 A1 | 9/2011 |

| RULE NUMBER | STATE | INPUT INFORMATION | OUTPUT INFORMATION |
|---|---|---|---|
| 1 | S | A | O |
| 2 | | B | P |
| 3 | T | A | P |
| 4 | | B | O |

MONITORING UNIT, CONTROL SYSTEM, AND COMPUTER READABLE MEDIUM

TECHNICAL FIELD

The present invention relates to a technique for monitoring the operation of a control unit.

BACKGROUND ART

In the field of automotive industry, the trend for higher functionality has been advancing in order to cope with the users need for safe driving. The automatic braking function, the pre-crash safety function, and the like which are becoming popular in recent years are some of the examples. In such a function, a plurality of inputs and outputs are related to each other in a complicated manner. Thus, if an abnormality occurs in the function, the function may impair the safety adversely. In view of this, the ISO 26262 Function Safety Standard for ensuring the automobile safety in terms of functions and certifying this was formulated in November 2011.

As a component that takes charge of the control of the automobile functions, a control unit configured by a microcomputer or the like can be raised. To cope with the requirement for the Function Safety Standard, sufficient safety measures must be employed in the control unit so that a sufficient decrease in the risk of failure is certified.

Patent literatures 1 and 2 describe the safety measures for the control unit.

Patent literature 1 describes incorporating, as a vehicle control unit, a control unit and another control unit that monitors the control unit.

Patent literature 2 describes monitoring a control unit by a monitoring unit which adopts the lock step technique employed among virtual CPUs. Patent literature 2 has a configuration in which an abnormality in the control unit is detected by determining the validity of the input/output information of the control unit.

CITATION LIST

Patent Literature

Patent Literature 1: JP 2012-60842A
Patent Literature 2: JP2013-25570A

SUMMARY OF INVENTION

Technical Problem

The measures described in Patent literatures 1 and 2 have a problem in that the control unit requires an additional constituent element for the safety measure, such as a connection port for a control line.

It is an object of the present invention to implement a monitoring function for the control unit without providing the control unit with an additional constituent element.

Solution to Problem

A monitoring unit according to the present invention, in a control system including a parent control unit and a child control unit which controls a device in accordance with control carried out by the parent control unit, monitors an operation of the parent control unit and includes:

a diagnostic data memory part to store diagnostic data for diagnosing the operation of the parent control unit;

an information acquiring part to acquire communication data being communicated between the parent control unit and the child control unit; and a diagnosing part to diagnose the operation of the parent control unit based on the diagnostic data stored by the diagnostic data memory part and the communication data acquired by the information acquiring part.

Advantageous Effects of Invention

The monitoring unit according to the present invention, when a control unit is formed of a parent control unit and a child control unit, diagnoses an abnormality in the parent control unit based on communication data being exchanged between the parent control unit and the child control unit. Hence, the abnormality in the parent control unit can be monitored without providing the parent control unit with an additional constituent element such as a connection port for a control line.

DESCRIPTION OF EMBODIMENTS

Embodiment 1

Figure 1:
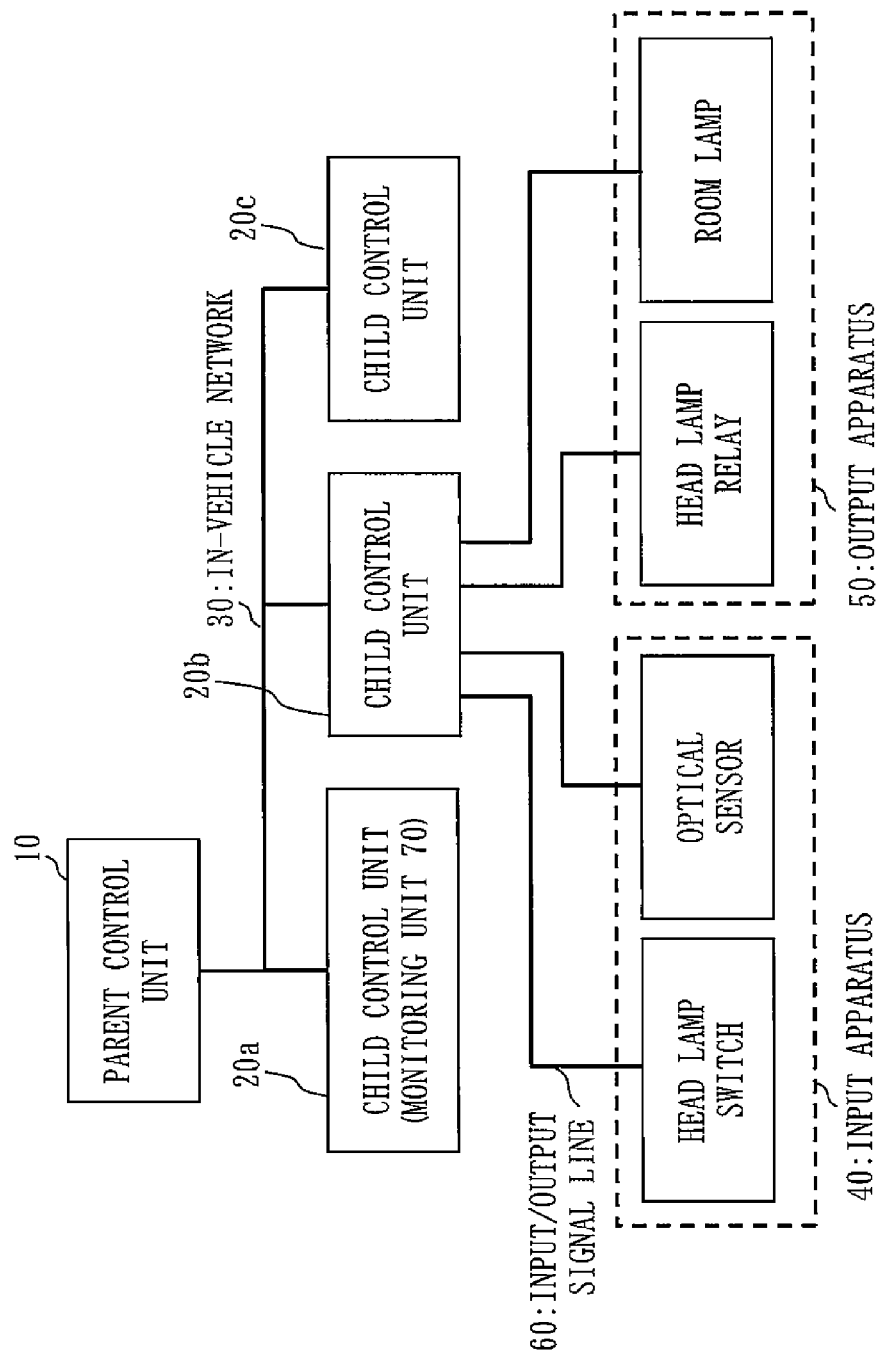
FIG. 1 is a configuration diagram of an in-vehicle network system 100 according to Embodiment 1.

FIG. 1 is a configuration diagram of an in-vehicle network system 100 according to Embodiment 1.

The in-vehicle network system 100 includes a parent control unit 10, a plurality of child control units 20 (child control units 20a to 20c in FIG. 1), an in-vehicle network 30 which connects the parent control unit 10 and each child control unit 20, an input apparatus 40 and an output apparatus 50 (examples of a device) each serving as a control target, and an input/output signal line 60 which connects the child control units 20 and the input apparatus 40, and connects the child control units 20 and the output apparatus 50.

Assume that of the child control units 20, at least one (the child control unit 20a in FIG. 1) is a monitoring unit 70 which monitors the operation of the parent control unit 10. In the following description, assume that a child control unit 20 if merely described so signifies a child control unit 20 that is not a monitoring unit 70.

The input apparatus 40 is, for example, a sensor device (an optical sensor or the like) or a switch (a head lamp switch or the like). The output apparatus 50 is, for example, a driving device (a wiper, a power window, or the like) or a light-emitting device (a head lamp, a room lamp, or the like).

Figure 2:
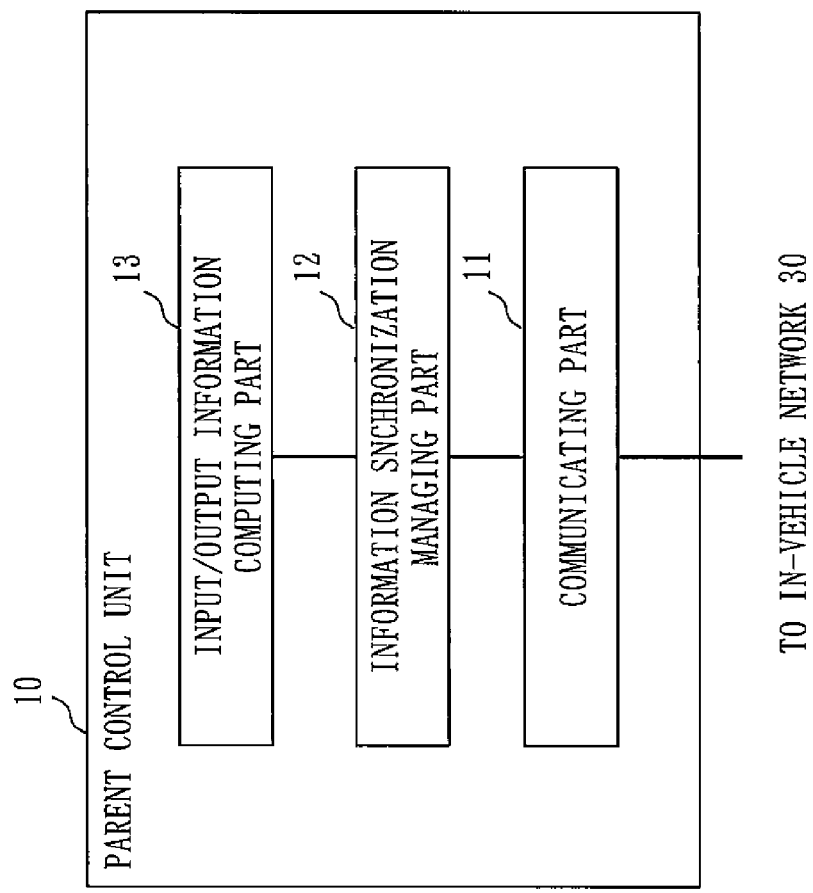
FIG. 2 is a configuration diagram of a parent control unit 10 according to Embodiment 1.

FIG. 2 is a configuration diagram of the parent control unit 10 according to Embodiment 1.

The parent control unit 10 includes a communicating part 11, an information synchronization managing part 12, and an input/output information computing part 13.

The communicating part 11 transmits/receives communication data to/from the child control unit 20 via the in-vehicle network 30.

The information synchronization managing part 12 periodically acquires and stores input information of the input apparatus 40 connected to the in-vehicle network system 100. The information synchronization managing part 12 also outputs output information, being a computation result of the input operation by the input/output information computing part 13, to the child control unit 20.

The input/output information computing part 13 looks up the input information stored in the information synchronization managing part 12 and computes the output information in accordance with a predetermined input/output rule. The input/output rule may be, for example, a rule "to turn ON an output to a head lamp relay when the switch of the head lamp is turned ON" or a rule "to output a voltage that is x times the read value of the optical sensor to the room lamp where the voltage to be outputted should be z V or more".

Figure 3:
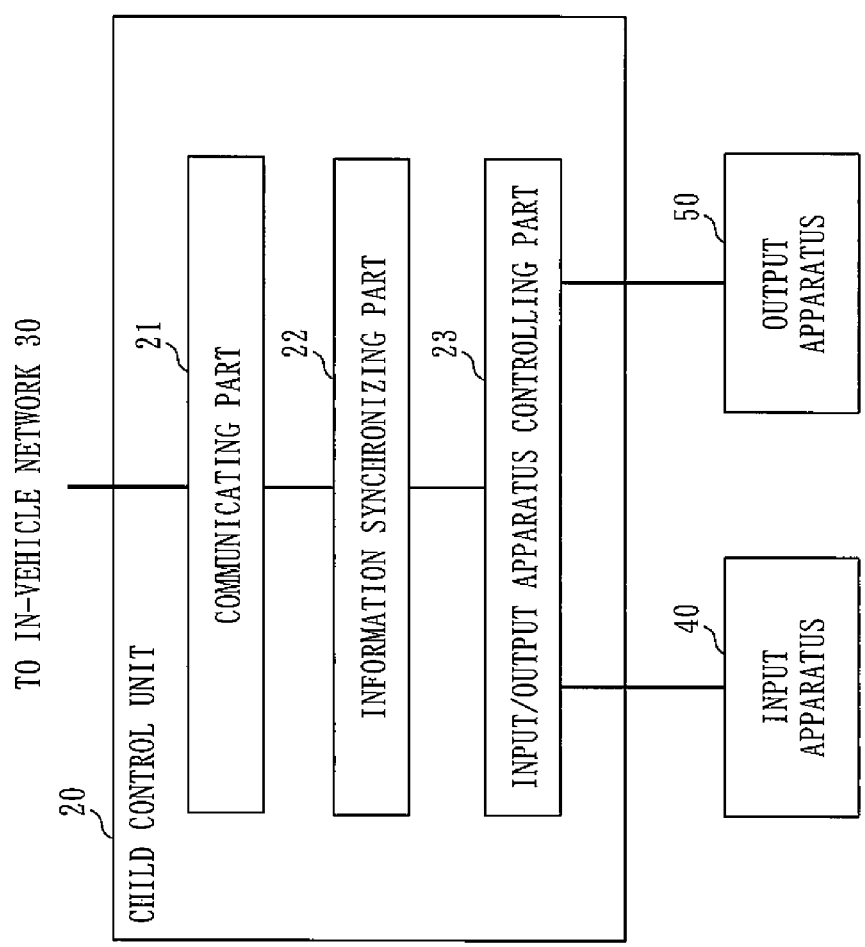
FIG. 3 is a configuration diagram of a child control unit 20 according to Embodiment 1.

FIG. 3 is a configuration diagram of the child control unit 20 according to Embodiment 1.

The child control unit 20 includes a communicating part 21, an information synchronizing part 22, and an input/output apparatus controlling part 23.

The communicating part 21 transmits/receives the communication data to/from the parent control unit 10 via the in-vehicle network 30.

The information synchronizing part 22 transmits the input information of the input apparatus 40 connected to the child control unit 20 to the parent control unit 10 in response to a request of the parent control unit 10.

The input/output apparatus controlling part 23 outputs the output information to the output apparatus 50 connected to the child control unit 20 in response to a request of the parent control unit 10.

The in-vehicle network 30 connects the in-vehicle network 30 and each child control unit 20. Note that the in-vehicle network 30 does not connect the parent control unit 10 and each child control unit 20 by 1-to-1 connection. Rather, the vehicle network 30 is a bus-formed network in which a signal transmitted from a certain unit is received by the parent control unit 10 and all the child control units 20. For example, in FIG. 1, note that when the parent control unit 10 transmits a signal to a certain child control unit 20, the signal can be received by any child control unit 20. An example of the bus-formed network often employed by the in-vehicle network 30 is a CAN (Controller Area Network).

With the configuration of this in-vehicle network 30, any child control unit 20 can receive the input information of the input apparatus 40 which has been transmitted from another child control unit 20 to the parent control unit 10 and the output information which has been transmitted from the parent control unit 10 to another child control unit 20.

Figure 4:
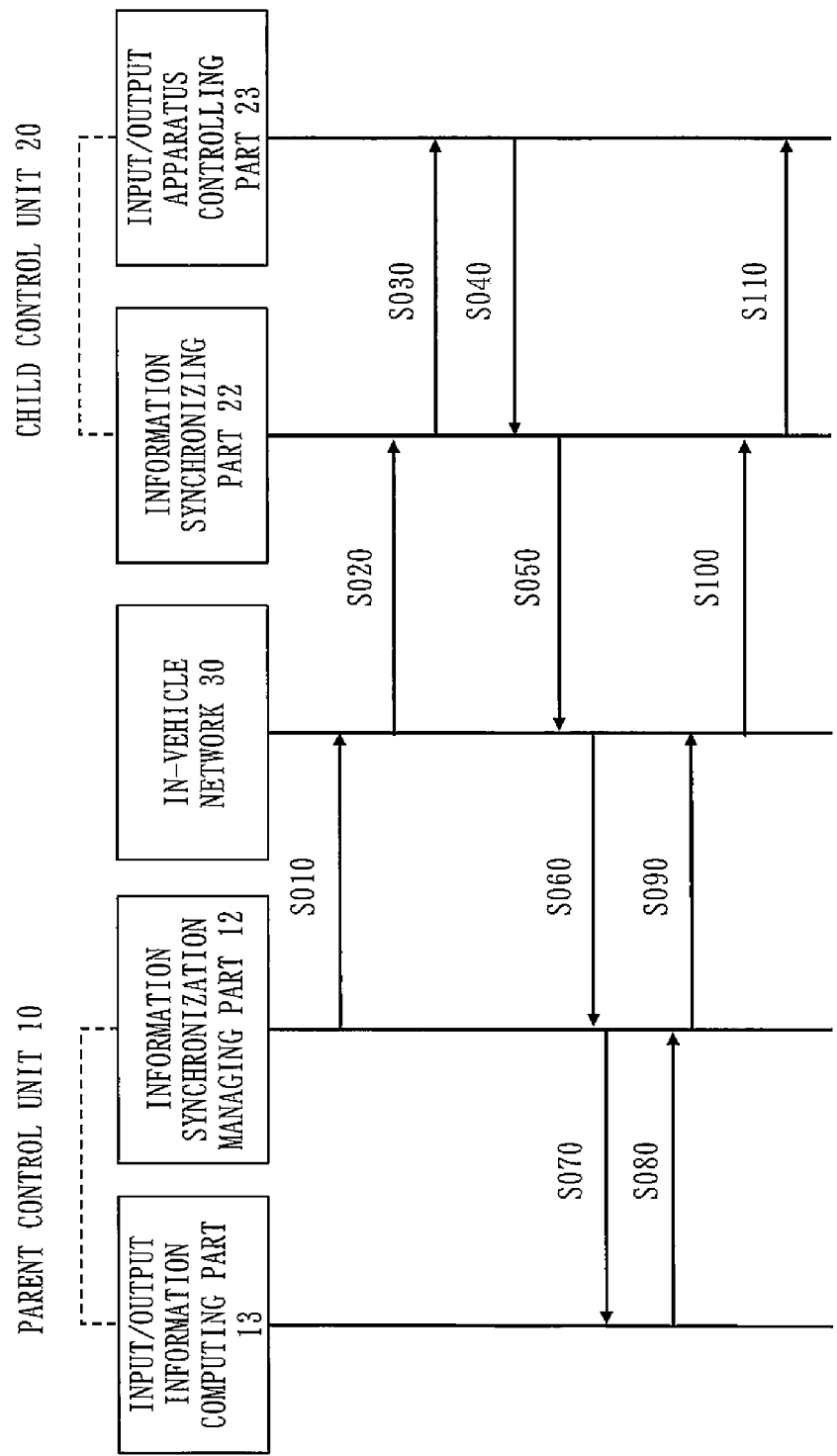
FIG. 4 is a diagram illustrating a normal operation of the in-vehicle network system 100 according to Embodiment 1.

FIG. 4 is a diagram illustrating a normal operation of the in-vehicle network system 100 according to Embodiment 1.

In the normal state, the parent control unit 10 controls the input apparatus 40 and output apparatus 50 connected to the child control unit 20, via the in-vehicle network 30. In this operation, the operations of S010 to S110 are repeated periodically.

First, the information synchronization managing part 12 of the parent control unit 10 transmits a request for the input information of the input apparatus 40 connected to each child control unit 20, via the communicating part 11 (S010). The request transmitted in S010 is communicated to each child control unit 20 via the in-vehicle network 30 (S020). The information synchronizing part 22 of each child control unit 20 inquires of the input/output apparatus controlling part 23 the input information of the input apparatus 40 connected (S030).

The input/output apparatus controlling part 23 of each child control unit 20 replies to the information synchronizing part 22 with the input information of the input apparatus 40 connected (S040). The information synchronizing part 22 of each child control unit 20 transmits the input information of the input apparatus 40 to the parent control unit 10 via the communicating part 21 (S050). The input information transmitted in S050 is communicated to the parent control unit 10 via the in-vehicle network 30 (S060). The information synchronization managing part 12 of the parent control unit 10 integrates the input information of the input apparatuses 40 transmitted from the respective child control units 20 and communicates the integrated input information to the input/output information computing part 13 (S070).

The input/output information computing part 13 of the parent control unit 10 computes the output information from the communicated input information in accordance with the input/output rule determined in advance (S080). The information synchronization managing part 12 of the parent control unit 10 transmits the output information computed in S080 to each child control unit 20 via the communicating part 11 (S090). The output information transmitted in S090 is communicated to each child control unit 20 via the in-vehicle network 30 (S100). The information synchronizing part 22 of each child control unit 20 communicates the output information communicated in S100 to the input/output apparatus controlling part 23, to cause the input/output apparatus controlling part 23 to control the output apparatus 50 (S110).

As described above, from S010 through S110, the parent control unit 10 generates the output information based on the input information connected from the child control units 20, and the child control units 20 execute output control.

A hardware failure possibly occurs in the parent control unit 10 randomly. Accordingly, an error is likely to occur in the computation of the output information in S080. If there is an error in the computation of the output information in S080, the control of the output apparatus 50 in S110 suffers. As a result, the output apparatus 50 may malfunction to impair the safety of the passengers and people around the vehicle. In view of this, according to Embodiment 1, one of the child control units 20 is used as the monitoring unit 70, and the monitoring unit 70 monitors the communication in the in-vehicle network 30, thereby monitoring an error in the control computation of the parent control unit 10.

Figure 5:
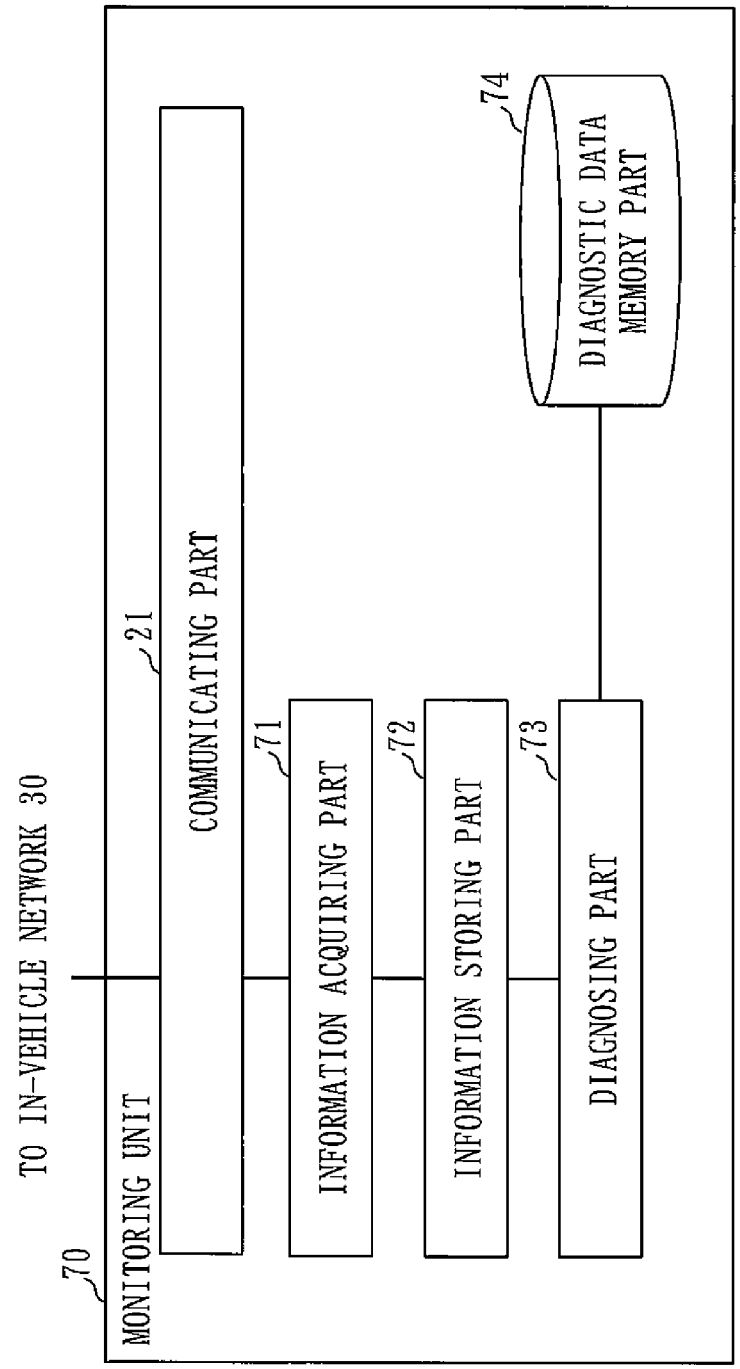
FIG. 5 is a configuration diagram of a monitoring unit 70 according to Embodiment 1.

FIG. 5 is a configuration diagram of the monitoring unit 70 according to Embodiment 1.

The monitoring unit 70 includes an information acquiring part 71, an information storing part 72, a diagnosing part 73, and a diagnostic data memory part 74, in addition to the constituent elements of the child control unit 20. In FIG. 5, the information synchronizing part 22 and the input/output apparatus controlling part 23 are not illustrated.

The information acquiring part 71 acquires (intercepts) the communication data flowing in the in-vehicle network 30 and necessary for estimating the validity of the input/output rule.

For example, assume an input/output rule A according to which "an output to the head lamp relay is turned ON when the switch of the head lamp is turned ON". At this time, in FIG. 1, the communication data necessary for estimating the validity of the input/output is input information of the head lamp switch which is transmitted from the child control unit 20 to the parent control unit 10 and output information for the head lamp relay which is transmitted from the parent control unit 10 to the child control unit 20.

The information storing part 72 stores the communication data necessary for estimating the validity of the input/output rule to the memory unit.

Under the input/output rule A, the information storing part 72 stores "information indicating whether an input of the switch of the head lamp is ON or OFF" and "information indicating whether an output to the head lamp relay is ON or OFF".

The diagnosing part 73 estimates the validity of the input/output rule.

Under the input/output rule A, the diagnosing part 73 determines whether the output to the head lamp relay is ON or not when the head lamp switch is turned ON. If the output to the head lamp relay is not ON even though the head lamp switch is ON, the diagnosing part 73 determines that the input/output validity is not satisfied.

The diagnostic data memory part 74 is a memory unit which stores input/output rules.

The diagnostic data memory part 74 stores various types of input/output rules such as the input/output rule A described above. The diagnostic data memory part 74 may store a table representing the relation between the input information and the output information, as the input/output rules, or a logical formula or equation representing the relation between the input information and the output information, as the input/output rules.

The monitoring unit 70 may be connected to the input apparatus 40 and output apparatus 50 in the same manner as the child control unit 20 is.

Figure 6:
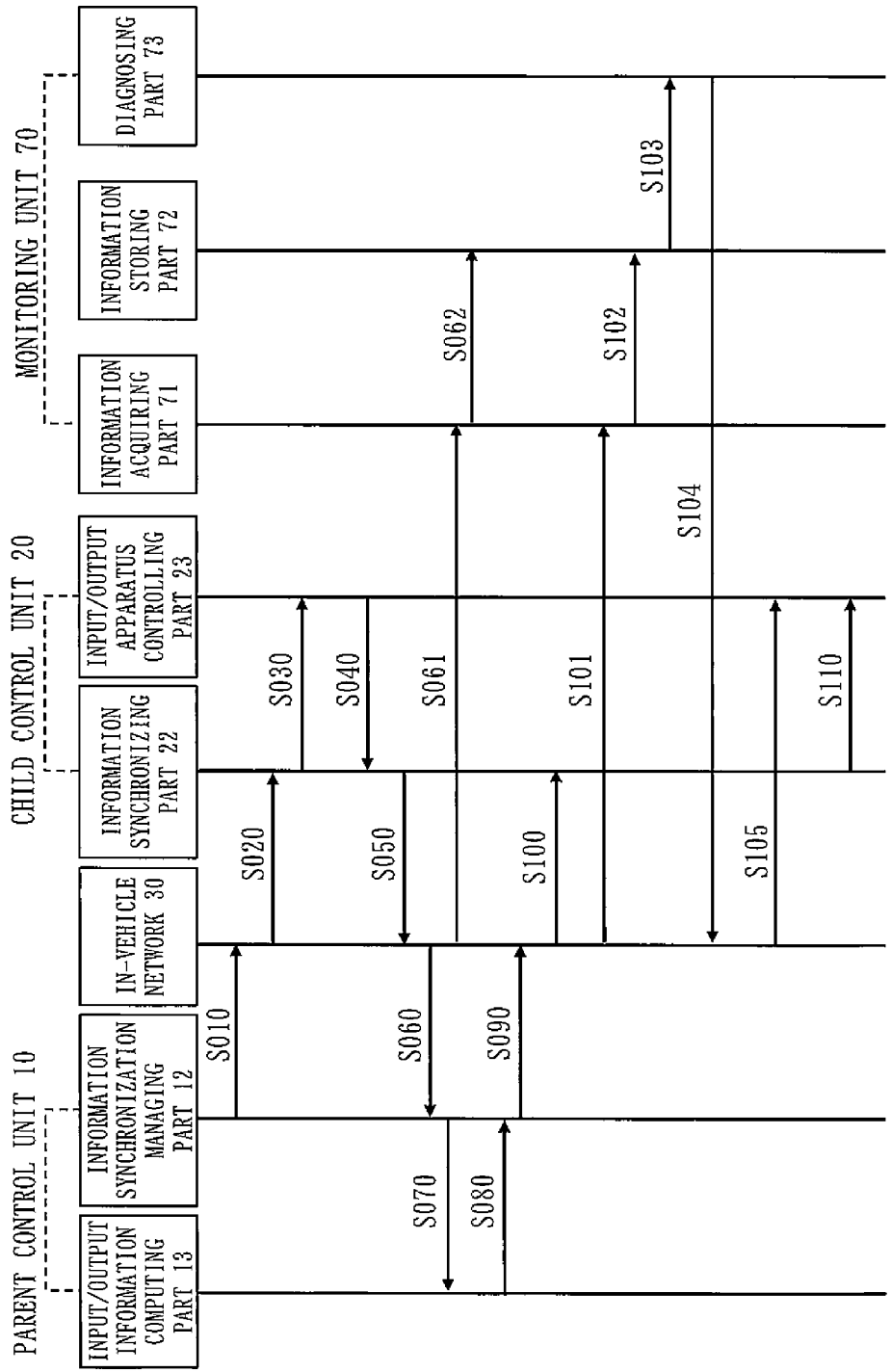
FIG. 6 is a diagram illustrating a monitoring operation of the in-vehicle network system 100 according to Embodiment 1.

FIG. 6 is a diagram illustrating a monitoring operation of the in-vehicle network system 100 according to Embodiment 1.

The monitoring operation is executed while the normal operation illustrated in FIG. 4 (S010 to S110) takes place. Thus, FIG. 6 illustrates the monitoring operation in the form of an add-on to the normal operation illustrated in FIG. 4.

First, the information acquiring part 71 of the monitoring unit 70 acquires the input information transmitted from the child control unit 20 in S050 and flowing in the in-vehicle network 30 in S060 (S061). The input information can be acquired easily as it is outputted to the bus-formed network.

The information storing part 72 of the monitoring unit 70 stores the input information acquired in S061 (S062).

The information acquiring part 71 of the monitoring unit 70 also acquires the output information transmitted from the parent control unit 10 in S090 and flowing in the in-vehicle network 30 in S100 (S101). The information storing part 72 of the monitoring unit 70 stores the output information acquired in S101 (S102).

The diagnosing part 73 of the monitoring unit 70 estimates the relation between the input information stored in S062 and the output information stored in S102, according to the input/output rule stored in the diagnostic data memory part 74 (S103). Hence, an erroneous computation done by the parent control unit 10 in S080 can be detected.

If estimation in S103 indicates deviation from the input/output rule, the diagnosing part 73 of the monitoring unit 70 communicates deviation from the input/output rule to the parent control unit 10 and each child control unit 20 (S104). At this time, if necessary, the diagnosing part 73 requests the input/output apparatus controlling part 23 to control the input apparatus 40 and output apparatus 50 to a specific fail safe state (S105). An example of the fail safe state may be the head light or wiper being kept ON.

For example, the diagnosing part 73 communicates deviation from the input/output rule to the parent control unit 10 and each child control unit 20, by transmitting a specific signal to the in-vehicle network 30, transmitting a signal via an exclusive reset signal line, or the like. In FIG. 6, it is assumed that a specific signal is transmitted to the in-vehicle network 30.

S061 to S062 and S101 to S105 described as the monitoring operation have no influence on the normal operation performed by the parent control unit 10 and the child control units 20 and require no special function or hardware for the parent control unit 10.

Hence, in the in-vehicle network system 100 according to Embodiment 1, the abnormality of the parent control unit 10 can be monitored without a need of providing the parent control unit 10 with an additional constituent element such as a connection port for a control line.

As described above, the normal operation of S010 through S110 is performed periodically. Hence, the relation between the input information and the output information over a plurality of periods may be estimated according to the input/output rule.

The input/output rule need not be limited to a 1-to-1 relation like the input/output rule A but can be a many-to-many relation with respect to the input apparatus 40 and output apparatus 50 connected to the child control unit 20.

The input/output rule may be merely a safety-related rule which, if not satisfied, leads to a risk of the human lives and property being endangered.

Embodiment 2

In Embodiment 1, the monitoring unit 70 only monitors the communication data of the in-vehicle network 30. Hence, the monitoring unit 70 is able to detect an abnormality only when computation of the output information actually takes place in the parent control unit 10. Therefore, when the parent control unit 10 is at fault, if the monitoring unit 70 has already been at fault, safe control cannot be ensured.

In view of this, according to Embodiment 2, a monitoring unit 70 transmits test data to a parent control unit 10 at an arbitrary timing in order to cause computation of desired output even when the computation is not actually needed, thereby diagnosing the parent control unit 10. This increases the possibility of detecting a failure of the parent control unit 10 prior to a failure of the monitoring unit 70.

In Embodiment 2, matters that are the same as in Embodiment 1 will not be described, and matters that are different from Embodiment 1 will be described.

Figure 7:
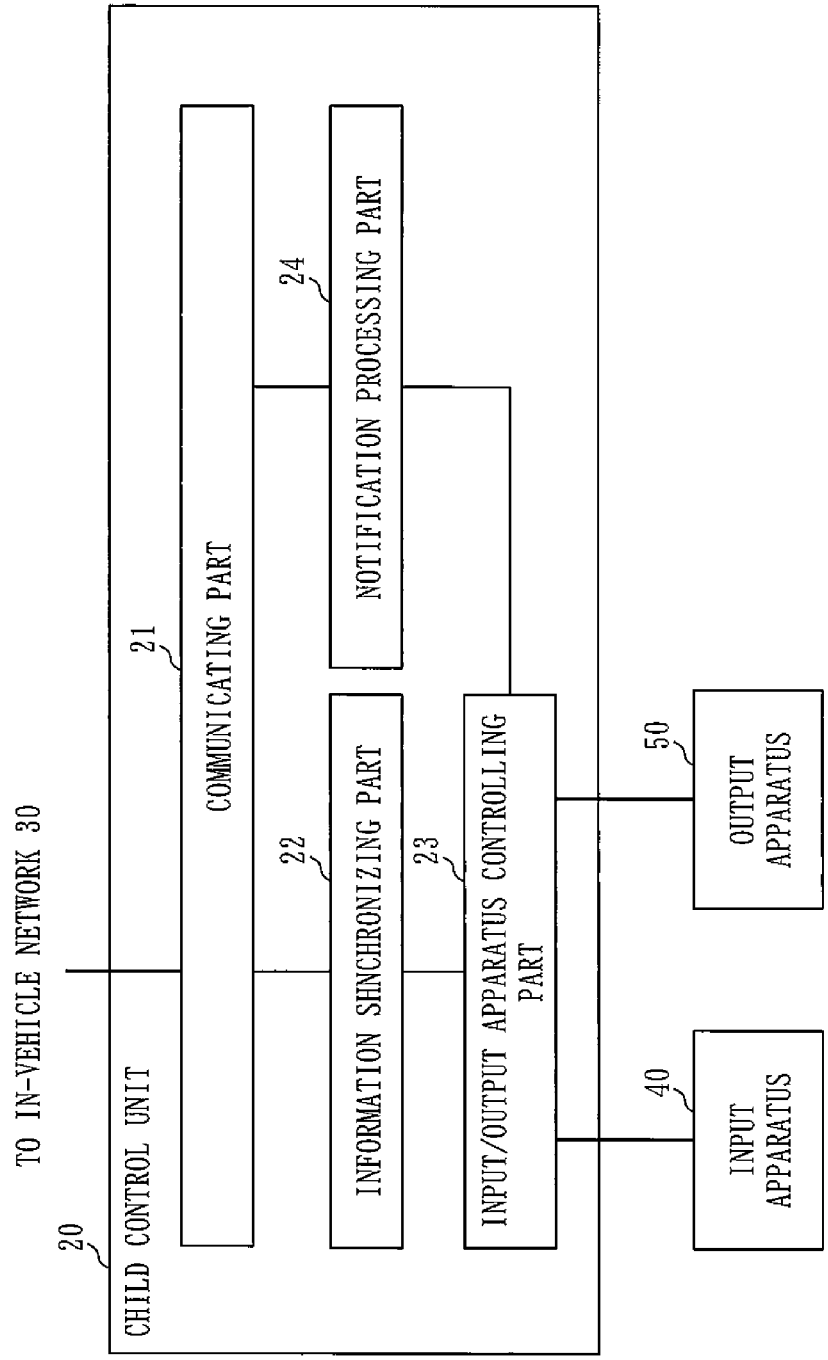
FIG. 7 is a configuration diagram of a child control unit 20 according to Embodiment 2.

FIG. 7 is a configuration diagram of a child control unit 20 according to Embodiment 2.

The child control unit 20 includes a notification processing part 24 in addition to the constituent elements illustrated in FIG. 3 of the child control unit 20 according to Embodiment 1.

The notification processing part 24 receives, from the monitoring unit 70, information indicating start and end of diagnosis carried out at an arbitrary timing by the monitoring unit 70.

The notification processing part 24 invalidates the process for an input/output apparatus controlling part 23 when the notification processing part 24 receives information indicating start of diagnosis. The notification processing part 24 validates the process for the input/output apparatus controlling part 23 when the notification processing part 24 receives information indicating end of diagnosis. When the process is invalidated, the input/output apparatus controlling part 23 retains output information as of the time point of invalidation, or retains safe output information.

Figure 8:
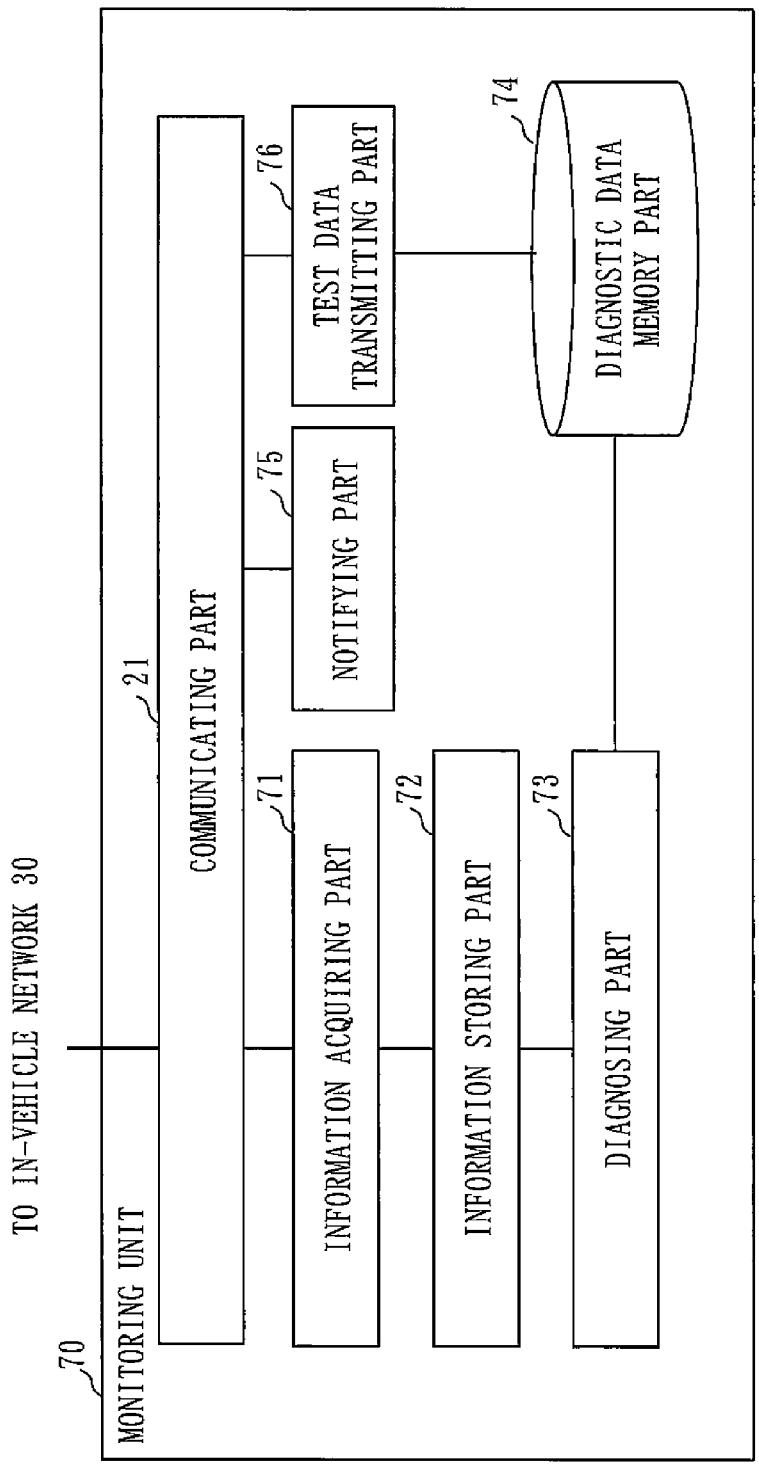
FIG. 8 is a configuration diagram of a monitoring unit 70 according to Embodiment 2.

FIG. 8 is a configuration diagram of the monitoring unit 70 according to Embodiment 2.

The monitoring unit 70 includes a notifying part 75 and a test data transmitting part 76 in addition to the constituent elements illustrated in FIG. 5 of the monitoring unit 70 according to Embodiment 1.

The notifying part 75 transmits information indicating start and end of diagnosis carried out at an arbitrary timing, to the child control unit 20 via an in-vehicle network 30.

The test data transmitting part 76 transmits, to the parent control unit 10 via the in-vehicle network 30, test data simulating input information which the child control unit 20 transmits to the parent control unit 10. The test data transmitting part 76 transmits, as the test data, the input information in the input/output rule stored by the diagnostic data memory part 74.

The test data transmitting part 76 may transmit test data simulating input information which one child control unit 20 transmits, or test data simulating input information which a plurality of child control units 20 transmit, simultaneously.

Figure 9:
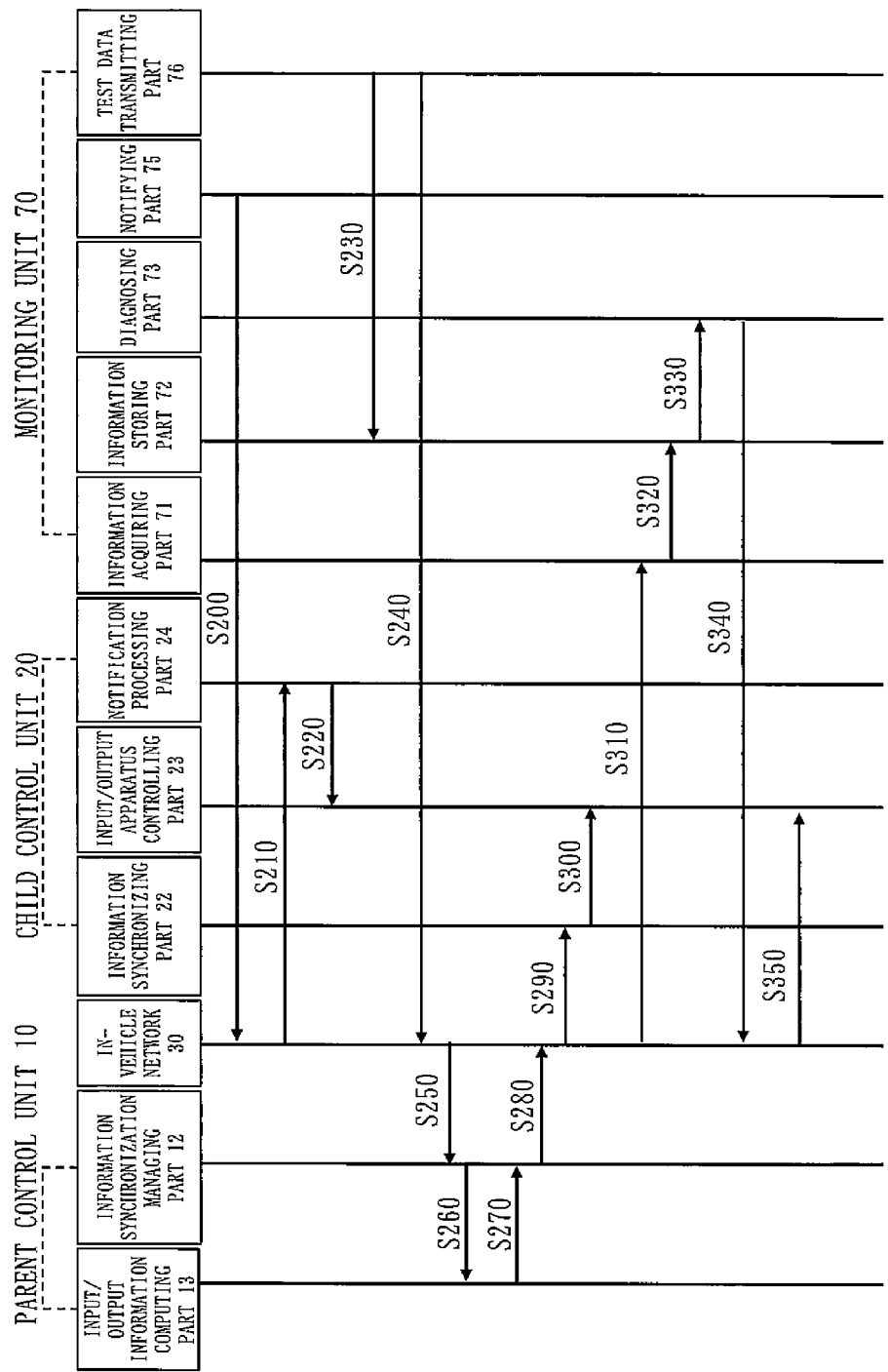
FIG. 9 is a diagram illustrating a diagnostic operation of an in-vehicle network system 100 according to Embodiment 2.

FIG. 9 is a diagram illustrating a diagnostic operation of an in-vehicle network system 100 according to Embodiment 2.

The diagnostic operation is started by the monitoring unit 70 at an arbitrary timing.

First, the notifying part 75 of the monitoring unit 70 notifies each child control unit 20 of a signal indicating diagnosis start, via a communicating part 21 (S200). Note that even when the parent control unit 10 receives this notification, the operation of the parent control unit 10 does not change at all. The notification transmitted in S200 is communicated to each child control unit 20 via the in-vehicle network 30 (S210). The notification processing part 24 of each child control unit 20 receives the notification transmitted in S210 and sets the input/output apparatus controlling part 23 to ignore the output information from the parent control unit 10 (S220). Namely, in S110 of the normal operation illustrated in FIG. 4, each child control unit 20 will not practice control based on the output information.

The test data transmitting part 76 of the monitoring unit 70 extracts, as the test data, the input information in the input/output rule stored in the diagnostic data memory part 74, and the information storing part 72 stores the extracted test data (S230). The test data transmitting part 76 transmits the test data extracted in S230 to the parent control unit 10 via the in-vehicle network 30 (S240). The test data transmitted in S240 is communicated to the parent control unit 10 via the in-vehicle network 30 (S250).

An information synchronization managing part 12 of the parent control unit 10 integrates input information being the test data of apparatuses communicated in S250, and communicates the integrated input information to the input/output information computing part 13 (S260).

An input/output information computing part 13 of the parent control unit 10 computes output information from input information communicated in S250 in accordance with an input/output rule regulated in advance, in the same manner as in S080 of the normal operation illustrated in FIG. 4 (S270). The information synchronization managing part 12 of the parent control unit 10 transmits the output information generated in S270 to each child control unit 20 via a communicating part 11, in the same manner as in S090 of the normal operation illustrated in FIG. 4 (S280). The output information transmitted in S280 is communicated to each child control unit 20 via the in-vehicle network 30 (S290). An information synchronizing part 22 of each child control unit 20 communicates the output information communicated in S290, to the input/output apparatus controlling part 23 (S300). Since the input/output apparatus controlling part 23 is set in S220 to ignore the output information, it does not practice the control based on the communicated output information.

An information acquiring part 71 of the monitoring unit 70 acquires the output information transmitted from the parent control unit 10 in S280 and flowing in the in-vehicle network 30 in S290, in the same manner as in S101 of the monitoring operation illustrated in FIG. 6 (S310). An information storing part 72 of the monitoring unit 70 stores the output information acquired in S310 (S320).

A diagnosing part 73 of the monitoring unit 70 treats the test data stored in S230, as the input information, and estimates the relation between the input information and the output information stored in S320, according to the input/output rule stored in a diagnostic data memory part 74 (S330). Hence, an erroneous computation done by the parent control unit 10 in S270 can be detected.

If estimation in S330 indicates deviation from the input/output rule, the diagnosing part 73 of the monitoring unit 70 communicates deviation from the input/output rule to the parent control unit 10 and each child control unit 20 (S340), in the same manner as in S104 of the monitoring operation illustrated in FIG. 6. At this time, if necessary, the diagnosing part 73 requests the input/output apparatus controlling part 23 to control an input apparatus 40 and an output apparatus 50 to a specific fail safe state (S305). If the automobile is in a safe state, the diagnosing part 73 may perform notification to the driver by means of light or sound.

The monitoring unit 70 repeats S230 through S350 as often as necessary. When all diagnoses end, the notifying part 75 transmits information indicating diagnosis end to each child control unit 20. After that, the normal operation illustrated in FIG. 4 is executed.

As described above, in the in-vehicle network system 100 according to Embodiment 2, an abnormality in the parent control unit 10 can be detected except when computation of the output information actually takes place in the parent control unit 10. This increases the possibility of detecting a failure of the parent control unit 10 prior to a failure of the monitoring unit 70.

The diagnosing operation may be performed at an arbitrary timing, as described above. If diagnosis is performed while the vehicle body and the driver are in the safe state, such as at the start of the engine, then the safety risk can be reduced more effectively.

The test data may be formulated based on the input information for a plurality of periods. This specifically enables diagnosis corresponding to a state transition of the parent control unit 10.

Figures 10, 11:
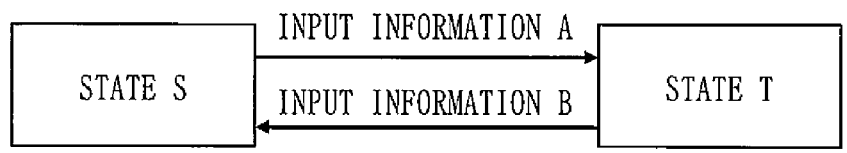
FIG. 10 is a state transition diagram of the parent control unit 10.
FIG. 11 is a diagram illustrating an input/output rule corresponding to FIG. 10.

For example, assume that the parent control unit 10 undergoes state transition illustrated in FIG. 10. More specifically, when in a state S, the parent control unit 10 undergoes transition to a state T in response to input information A from the child control unit 20. When in the state T, the parent control unit 10 undergoes transition to the state S in response to input information B from the child control unit 20.

At this time, assume that an input/output rule illustrated in FIG. 11 is given. For example, an input/output rule of rule number 1 in FIG. 11 represents a rule that in the state S, if input information A is present, then output information O is outputted.

Assume that the input/output rule of rule number 1 will be diagnosed. In this case, the monitoring unit 70 only needs to transmit the input information A as test data and to estimate if the output information O will be outputted from the parent control unit 10. However, subsequent to the input/output rule of rule number 1, if an input/output rule of rule number 2 is to be diagnosed, the diagnosis cannot be performed appropriately. More specifically, in the diagnosis of the input/output rule of rule number 1, the parent control unit 10 undergoes transition from the state S to the state T, and accordingly the parent control unit 10 is no longer in the state S where diagnosis of the input/output rule of rule number 2 is possible. Hence, even when the input information B is given so that the input/output rue of rule number 2 may be diagnosed, the output information O will be outputted according to rule number 4, instead of expected output information P.

Figure 12:
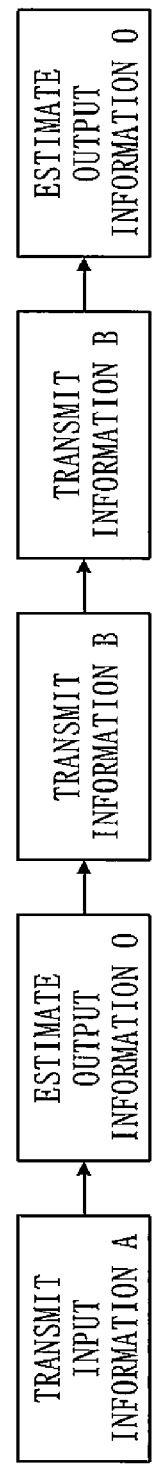
FIG. 12 is a diagram illustrating a test data transmission order.

In view of this, test data is transmitted in the order illustrated in FIG. 12, and estimation is performed. More specifically, first, when the parent control unit 10 is in the state S, the monitoring unit 70 transmits the input information A as the test data, and estimates that the output information O is outputted. Since the input information A is transmitted, the parent control unit 10 undergoes transition to the state T. Subsequently, the monitoring unit 70 transmits the input information B so that the parent control unit 10 undergoes transition to the state S. Then, the monitoring unit 70 transmits the input information B as the test data, and estimates that the output information P is outputted.

Figure 13:
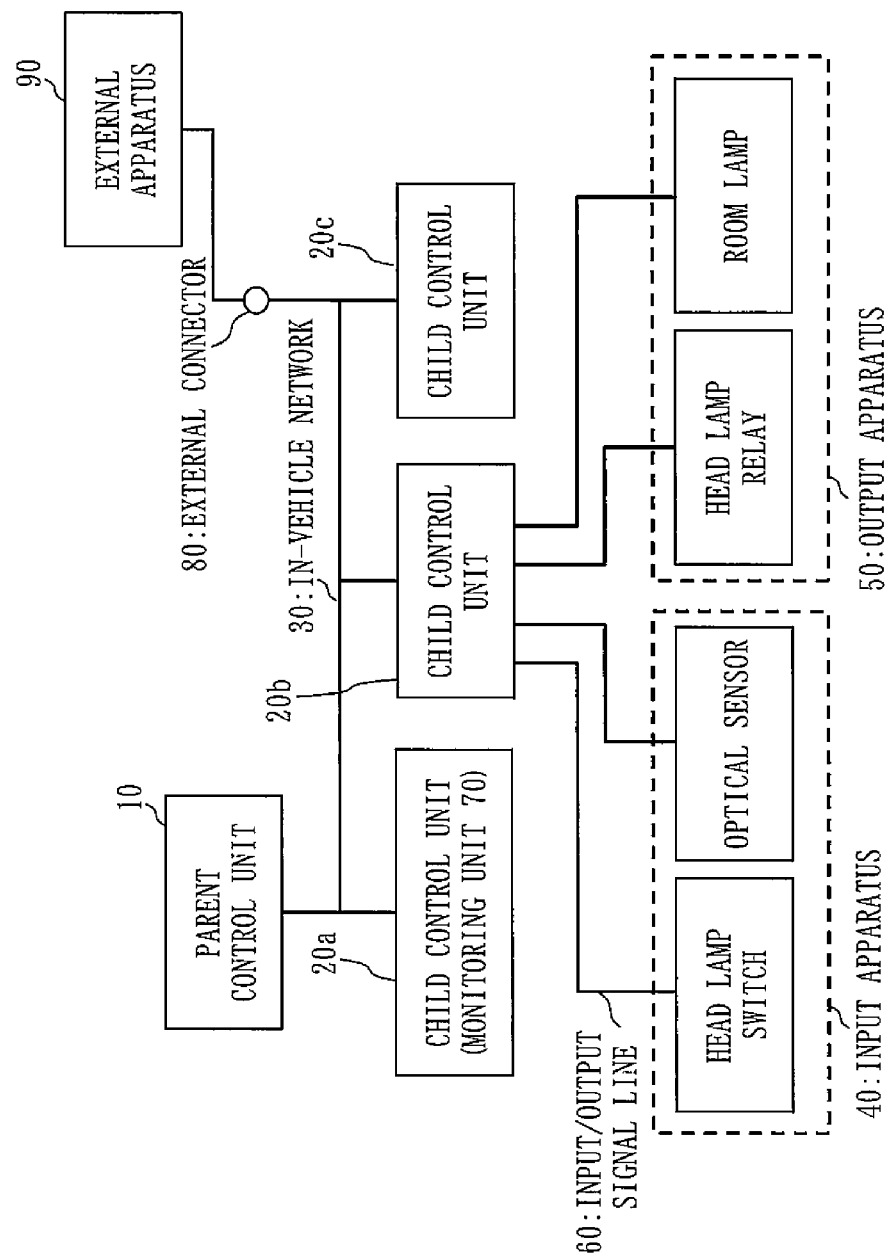
FIG. 13 is a configuration diagram, different from FIG. 1, of the in-vehicle network system 100.

In the above description, at least one of the child control units 20 is determined as the monitoring unit 70. However, the monitoring unit 70 may be provided independently of the child control units 20. For example, as illustrated in FIG. 13, the in-vehicle network 30 may be provided with an external connector 80, and an external apparatus 90 serving as the monitoring unit 70 may be connected to the external connector 80.

When the monitoring unit 70 is realized as the external apparatus 90, the degree of freedom in the hardware selection improves. Hence, the capacity of the memory unit to store the input/output rules can be increased, and a large number of input/output rules and the like can be stored. Consequently, diagnosis can be performed in more detail.

In the above description, monitoring and diagnosis of the control unit are exemplified in the in-vehicle network system 100. However, monitoring and diagnosis of the control unit can be performed not only in the in-vehicle network system 100 but also in other units and systems as well.

Figure 14:
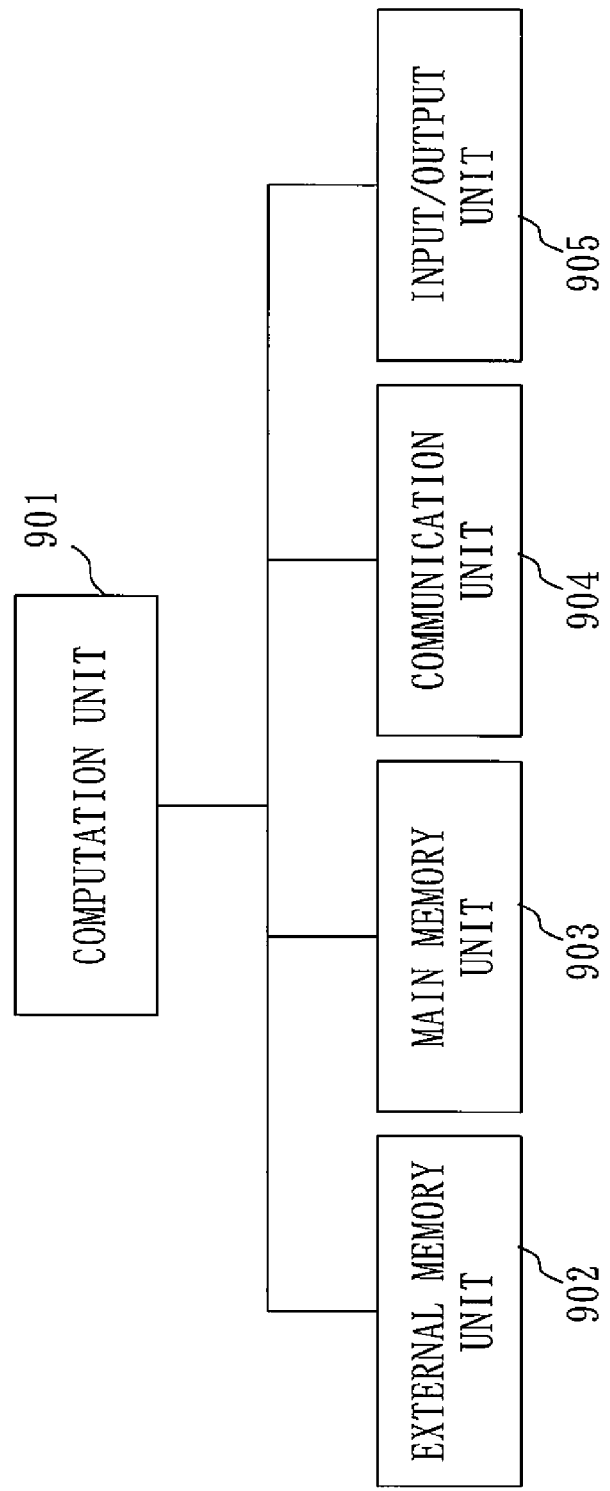
FIG. 14 is a diagram illustrating an example of the hardware configuration of the parent control unit 10, the child control units 20, the monitoring unit 70, and an external apparatus 90 indicated in Embodiments 1 and 2.

FIG. 14 is a diagram illustrating an example of the hardware configuration of the parent control unit 10, the child control units 20, the monitoring unit 70, and the external apparatus 90 indicated in Embodiments 1 and 2.

The parent control unit 10, the child control unit 20, the monitoring unit 70, and the external apparatus 90 are computers, and the elements of each of the parent control unit 10, the child control unit 20, the monitoring unit 70, and the external apparatus 90 can be realized by programs.

According to the hardware configuration of the parent control unit 10, the child control unit 20, the monitoring unit 70, and the external apparatus 90, a computation unit 901, an external memory unit 902, a main memory unit 903, a communication unit 904, and an input/output unit 905 are connected to a bus.

The computation unit 901 is a CPU (Central Processing Unit) or the like that executes the programs. The external memory unit 902 is, for example, a ROM (Read Only Memory), a flash memory, a hard disk unit, or the like. The main memory unit 903 is, for example, a RAM (Random Access Memory) or the like. The communication unit 904 is, for example, a communication board or the like. The input/output unit 905 is, for example, a mouse, a keyboard, a display unit, or the like.

The programs are usually stored in the external memory unit 902. As the programs are loaded in the main memory unit 903, they are sequentially read by the computation unit 901 and executed.

The programs are those that realize the functions described as the communicating part 11, information synchronization managing part 12, input/output information computing part 13, communicating part 21, information synchronizing part 22, input/output apparatus controlling part 23, notification processing part 24, information acquiring part 71, information storing part 72, diagnosing part 73, diagnostic data memory part 74, notifying part 75, and test data transmitting part 76.

Furthermore, the external memory unit 902 also stores an operating system (OS). At least part of the OS is loaded to the main memory unit 903. The computation unit 901 executes the programs while executing the OS.

Also, information, data, signal values, and variable values indicating the results of processes described as "transmission", "reception", "acquisition", "storing", "output", "computation", "determination", and the like in Embodiments 1 and 2 are stored in the main memory unit 903 in the form of files.

The configuration of FIG. 14 is merely an example of the hardware configuration of each unit. The hardware configuration of each unit is not limited to the configuration presented in FIG. 14 but can have another configuration.

REFERENCE SIGNS LIST

100: in-vehicle network system; 10: parent control unit; 11: communicating part; 12: information synchronization managing part; 13: input/output information computing part; 20: child control unit; 21: communicating part; 22: information synchronizing part; 23: input/output apparatus controlling part; 24: notification processing part; 30: in-vehicle network; 40: input apparatus; 50: output apparatus; 60: input/output signal line; 70: monitoring unit; 71: information acquiring part; 72: information storing part; 73: diagnosing part; 74: diagnostic data memory part; 75: notifying part; 76: test data transmitting part

The invention claimed is:

1. A monitoring unit in a control system including a parent control unit and a plurality of child control units, where each child control unit controls a device in accordance with control carried out by the parent control unit, the monitoring unit being one the plurality of child control units, serving to monitor an operation of the parent control unit, and comprising:
   a diagnostic data memory part to store diagnostic data for diagnosing the operation of the parent control unit, the diagnostic data including input/output rules;
   an information acquiring part to acquire communication data communicated between the parent control unit and the plurality of child control units via a controller area network, the communication data including input information transmitted from a child control unit to the parent control unit and output information transmitted from the parent control unit to a child control unit; and
   a diagnosing part to diagnose the operation of the parent control unit based on the diagnostic data stored by the diagnostic data memory part and the communication data acquired by the information acquiring part by estimating a relation between the acquired input information and the acquired output information and comparing the estimated relation with the input/output rules,
   wherein the diagnosing part makes a request based on a diagnostic result so that the device is controlled to a fail safe state.

2. The monitoring unit according to claim 1,
   wherein the parent control unit computes output data with respect to input data sent from the child control unit and outputs the computed output data to the child control unit,
   wherein the child control unit controls the device based on the output data outputted from the parent control unit,
   wherein the diagnostic data memory part stores a correspondence relation between the input data and the output data, as the diagnostic data,
   wherein the information acquiring part acquires the input data transmitted from the child control unit to the parent control unit, and the output data transmitted from the parent control unit to the child control unit, and
   wherein the diagnostic part diagnoses the operation of the parent control unit by determining whether or not the input data and output data acquired by the information acquiring part satisfy the correspondence relation.

3. The monitoring unit according to claim 2, further comprising
   a test data transmitting part to transmit test data to the parent control unit,
   wherein the parent control unit computes the output data by treating, as the input data from the child control unit, the test data transmitted by the test data transmitting part,
   wherein the information acquiring part acquires the output data transmitted from the parent control unit to the child control unit, and
   wherein the diagnostic part diagnoses the operation of the parent control unit by determining whether or not the test data and the output data which is acquired by the information acquiring part satisfy the correspondence relation.

4. The monitoring unit according to claim 3, further comprising
   a notifying part to notify the parent control unit not to control the device temporarily based on the output data when the test data transmitting part is to transmit the test data.

5. A control system comprising a parent control unit, a plurality of child control units, where each child control unit controls a device in accordance with control carried out by the parent control unit, and a monitoring unit to monitor an operation of the parent control unit,
   the monitoring unit including:
   a diagnostic data memory part to store diagnostic data for diagnosing the operation of the parent control unit, the diagnostic data including input/output rules;
   an information acquiring part to acquire communication data communicated between the parent control unit and the plurality of child control units via a controller area network, the communication data including input information transmitted from a child control unit to the parent control unit and output information transmitted from the parent control unit to a child control unit; and
   a diagnosing part to diagnose the operation of the parent control unit based on the diagnostic data stored by the diagnostic data memory part and the communication data acquired by the information acquiring part by estimating a relation between the acquired input information and the acquired output information and comparing the estimated relation with the input/output rules.

6. A non-transitory computer readable medium having stored thereon a monitoring program in a control system including a parent control unit and a plurality of child control units, where each child control unit controls a device in accordance with control carried out by the parent control unit, the monitoring program monitoring an operation of the parent control unit and causing a computer to execute:
   an information acquiring process of acquiring communication data communicated between the parent control unit and the plurality of child control units via a controller area network, the communication data including input information transmitted from a child control unit to the parent control unit and output information transmitted from the parent control unit to a child control unit; and
   a diagnostic process of diagnosing the operation of the parent control unit based on diagnostic data stored in a memory unit and serving to diagnose the operation of the parent control unit, and the communication data acquired in the information acquiring process by estimating a relation between the acquired input information and the acquired output information and comparing the estimated relation with the input/output rules,
   wherein the diagnostic process includes making a request based on a diagnostic result so that the device is controlled to a fail safe state.

* * * * *